(12) United States Patent
Huang

(10) Patent No.: US 11,312,574 B2
(45) Date of Patent: Apr. 26, 2022

(54) VEHICLE STATUS REPORTING FOR HIGH THROUGHPUT INDEPENDENT CART SYSTEM

(71) Applicant: Rockwell Automation Technologies, Inc., Mayfield Heights, OH (US)

(72) Inventor: Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 254 days.

(21) Appl. No.: 16/794,552

(22) Filed: Feb. 19, 2020

(65) Prior Publication Data

US 2021/0253351 A1    Aug. 19, 2021

(51) Int. Cl.
*B65G 1/137* (2006.01)
*G05B 19/042* (2006.01)

(52) U.S. Cl.
CPC ......... *B65G 1/1375* (2013.01); *G05B 19/042* (2013.01); *G05B 2219/25338* (2013.01)

(58) Field of Classification Search
CPC ............................ B65G 1/1375; G05B 19/042
USPC ......................................................... 700/218
See application file for complete search history.

(56) References Cited

U.S. PATENT DOCUMENTS

| 2010/0241269 | A1* | 9/2010 | Ham | ................ | G06Q 10/06375 |
| | | | | | 700/214 |
| 2017/0300753 | A1* | 10/2017 | Billi | ...................... | H04N 7/181 |
| 2017/0344009 | A1* | 11/2017 | Wernersbach | ............ | B66F 9/00 |
| 2020/0017308 | A1 | 1/2020 | Huang et al. | | |
| 2020/0202285 | A1* | 6/2020 | Elazary | ................ | G06Q 10/087 |

FOREIGN PATENT DOCUMENTS

WO      2017205607 A1      11/2017

OTHER PUBLICATIONS

Extended European Search Report dated Jul. 6, 2021; Application / Patent No. 21157856.2-1215—(5) pages.

* cited by examiner

*Primary Examiner* — Mohammad Ali
*Assistant Examiner* — Joshua T Sanders
(74) *Attorney, Agent, or Firm* — Boyle Fredrickson, SC

(57) ABSTRACT

An improved method and system increases throughput in an independent cart system. The independent cart system includes multiple movers, controlled by a first controller, travelling along a track. At least one station is defined, where a device external to the track interacts with the movers on the track. A process controller controls operation of the external device and receives a communication from the first controller to begin execution of a task that the external device must complete prior to interaction with the mover. The first controller determines a time to destination for each mover to reach the station and transmits the signal or data packet to the process controller to initiate execution of the preparation task with sufficient time for the process controller to begin or complete the preparation task prior to the mover arriving at the station.

20 Claims, 7 Drawing Sheets

VEHICLE STATUS REPORTING FOR HIGH THROUGHPUT INDEPENDENT CART SYSTEM

BACKGROUND INFORMATION

The present invention relates to motion control systems and, more specifically, to improved control of movers traveling between track segments in a linear drive system.

Motion control systems utilizing movers and linear drives can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

Typically, a process controller is provided to control operation of the actuators interacting with the movers at each station. Initially, the process controller waits for a mover to arrive at the station before interacting with the mover. The process controller may, for example, receive a signal from a sensor detecting that the mover is at the station. Optionally, another controller responsible for controlling motion of the mover along the track generates a signal or sends a message to the process controller when the mover has arrived at the station. Once the process controller receives an indication of the mover arriving at the station, the process controller cycles each actuator through the required task or tasks to be performed at the station and provides an indication that the task is complete. When the task is complete, the mover may transit to the next station.

At some of the stations, however, the actuators may require some initial preparation before interacting with the mover. For example, a radio frequency identification (RFID) reader may require one half second to prepare for reading a RFID tag located on the mover or a robotic arm may require several seconds to obtain and/or position a part to be loaded on to the mover after the mover arrives at the position. Because the process controller waits for the mover to arrive at a station before beginning to interact with the mover, this initial preparation time increases the amount of time a mover remains at the station before moving to the next station, decreasing the overall throughput of the system.

Historically, throughput issues in an independent cart system have been addressed by increasing the speed at which a mover transits between stations. The independent cart system utilizes a linear drive which can provide near instantaneous torque production by the application of a voltage to the coils along the track. The voltage, in turn, creates a current flowing through the coil and establishes an electromagnetic field which interacts with a passive drive member, such as a permanent magnet, mounted on the mover. The rapid torque production allows for rapid acceleration from, and deceleration into, a station. In addition, a linear drive may provide a high velocity of travel between stations.

Increasing the rate of acceleration and deceleration or the velocity of travel is not, however, without certain drawbacks. The mover travels between stations at an increased rate, but the mover may also require additional time to settle to a complete stop once arriving at a station. The increased deceleration from a greater speed may result in some oscillation at the station when the mover arrives in position. Additionally, if a load is present on the mover, increasing the acceleration and deceleration or the velocity of travel may damage the load or cause the load, or a portion thereof, to fall off the mover. There is, therefore, a limit to the maximum throughput that may be achieved by increasing the rate of acceleration and deceleration by the linear drive in the independent cart system.

Thus, it would be desirable to provide an improved method and system for increasing throughput in an independent cart system.

BRIEF DESCRIPTION

According to one embodiment of the invention, an apparatus for increasing throughput in an independent cart system includes multiple movers and a track along which the movers travel. The track includes multiple track segments and a station position located along a length of one of the track segments. Each of the track segments includes a segment controller operative to control operation of each of the movers present on the corresponding track segment. The station position is configured to have the movers stop for interaction with a device external to the track at the station position, and a process controller is in communication with the segment controller on each of the plurality of track segments. A first segment controller located on one of the track segments is operative to determine a time to destination for a first mover, where the first mover is selected from the multiple movers. The time to destination corresponds to a time for the first mover to arrive at the station position from a current position of the first mover. The first segment controller is further operative to transmit the time to destination to the process controller before the first mover arrives at the station position, and the process controller is operative to initiate execution of at least one preparation task for the device at the station position responsive to receiving the time to destination from the first segment controller and before the first mover arrives at the station position.

According to another embodiment of the invention, a method for increasing throughput in an independent cart system is disclosed. A time to destination of a first mover located along a length of a track in the independent cart system is determined, where the first mover is selected from multiple movers present in the independent cart system. The track includes multiple track segments, and the time to destination corresponds to a time for the first mover to arrive at a station position from a current position of the first mover. Each track segment includes a segment controller operative to control operation of each mover present on the corresponding track segment, and the segment controller determines the time to destination. The time to destination is transmitted from the segment controller to a process controller in communication with the segment controller. The process controller is operative to initiate execution of at least one preparation task for a device configured to interact with the first mover at the station position, and the time to destination is transmitted prior to the first mover arriving at the station position.

According to still another embodiment of the invention, a method for increasing throughput in an independent cart system includes determining a time to destination of a first mover located along a length of a track in the independent cart system, where the first mover is selected from multiple movers present in the independent cart system. The track includes multiple track segments, and the time to destination corresponds to a time for the first mover to arrive at a station position from a current position of the first mover. Each track segment includes a first controller operative to control operation of each mover present on the corresponding track segment, and the first controller determines the time to destination. The time to destination is transmitted from the first controller to a second controller in communication with the first controller. The second controller is operative to initiate execution of at least one preparation task for a device configured to interact with the first mover at the station position, and the time to destination is transmitted prior to the first mover arriving at the station position.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
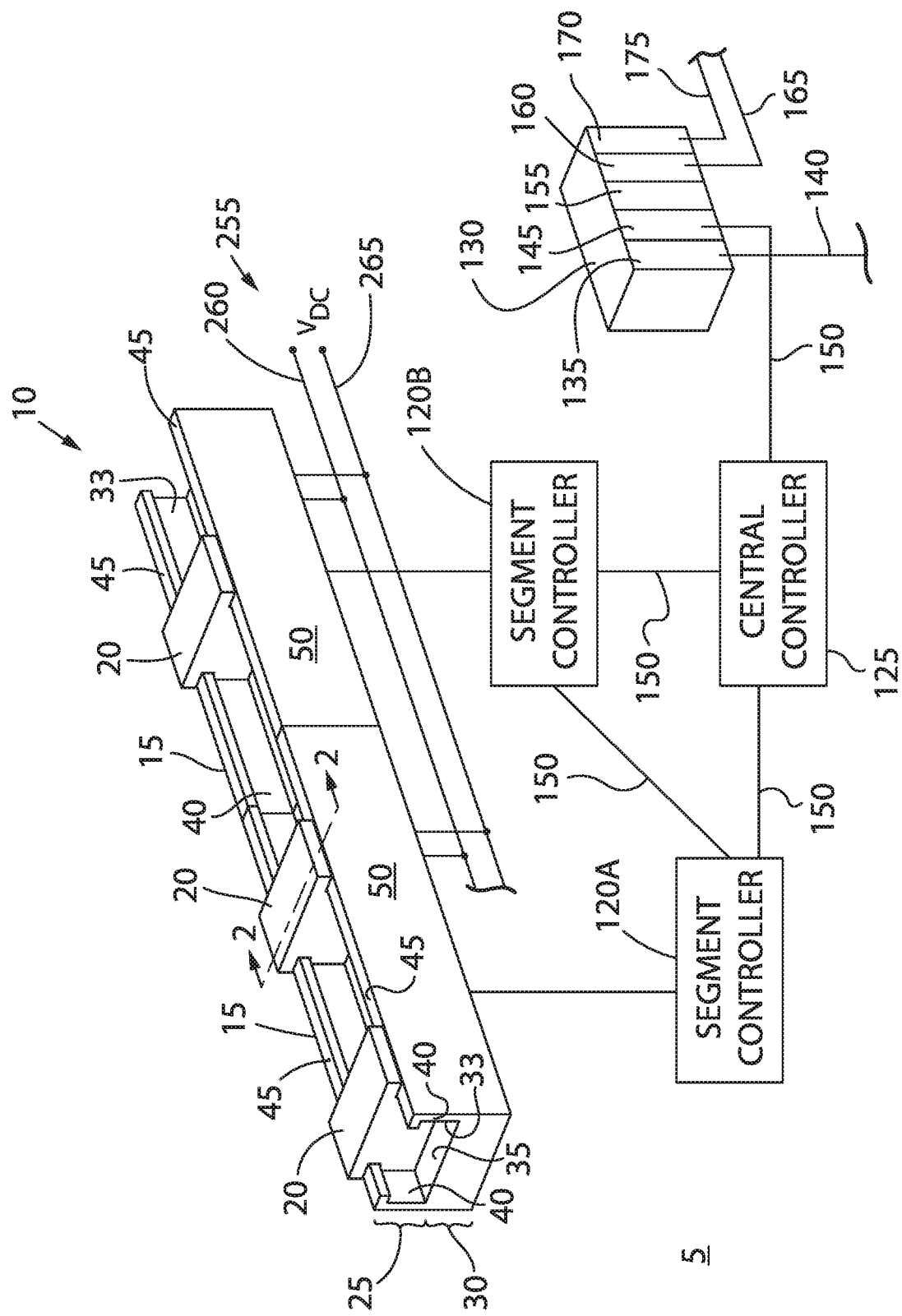
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein discloses an improved method and system for increasing throughput in an independent cart system. The independent cart system includes multiple movers travelling along a track, where the movers are controlled by a first controller. According to one embodiment of the invention, the first controller is a central controller responsible for the motion of each of the movers travelling on the track. According to another embodiment of the invention, the first controller includes multiple distributed controllers spread along the track, where each of the distributed controllers is responsible for the motion of a portion of the movers travelling along the track. At least one station is defined along the track, where a device external to the track interacts with the movers on the track.

A process controller controls operation of the external device, where the external device requires execution of at least one preparation task prior to interacting with the mover. The process controller is in communication with the first controller to receive a signal or data packet from the first controller to begin execution of the preparation task prior to the mover arriving at the station. The first controller determines a time to destination for each mover and transmits the signal or data packet to the process controller to initiate execution of the preparation task with sufficient time for the process controller to at least begin or to complete the preparation task prior to the mover arriving at the station. It is contemplated that the first controller may transmit the signal or data packet at a periodic interval or at a fixed distance prior to arriving at the station. Optionally, the first controller may determine a distance to travel during the time to reach the station and transmit the signal or data packet when the mover reaches or is approaching the distance to travel.

According to still another aspect of the invention, the first controller may maintain a record of the time to reach the destination and/or a settling time for the mover when it arrives at the station. The first controller may further determine a confidence value or a standard deviation of the current time to reach the destination and transmit the confidence value to the process controller as well.

Turning initially to FIGS. 1-4, an exemplary transport system 5 (or simply "system 5") for moving articles or products includes a track 10 made up of multiple segments 15. According to the illustrated system 5, two segments 15 are joined end-to-end to define the overall track configuration. The illustrated segments 15 are both straight segments having generally the same length. It is understood that track segments of various sizes, lengths, and shapes may be connected together to form the track 10 without deviating from the scope of the invention. Track segments 15 may be joined to form a generally closed loop supporting a set of movers 20 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The width of the track 10 may be greater in either the horizontal or vertical direction according to application requirements. The movers 20 will travel along the track and take various orientations according to the configuration of the track 10 and the relationships discussed herein may vary accordingly.

According to the illustrated system 5, each track segment 15 includes an upper portion 25 and a lower portion 30. The upper portion 25 is configured to carry the movers 20 and the lower portion 30 is configured to house the control elements. As illustrated, the upper portion 25 includes a generally u-shaped channel 33 extending longitudinally along the upper portion 25 of each segment. The channel 33 includes a bottom surface 35 and a pair of side walls 40, where each side wall 40 includes a rail 45 extending along an upper edge of the side wall 40. The bottom surface 35, side walls 40, and rails 45 extend longitudinally along the track segment 15 and define a guideway along which the movers 20 travel. According to one embodiment, the surfaces of the channel 33 (i.e., the bottom surface 35, side walls 40, and rails 45) are planar surfaces made of a low friction material along which movers 20 may slide. The contacting surfaces of the movers 20 may also be planar and made of a low friction material. It is contemplated that the surface may be, for example, nylon, Teflon®, aluminum, stainless steel and the like. Optionally, the hardness of the surfaces on the track segment 15 are greater than the contacting surface of the movers 20 such that the contacting surfaces of the movers 20 wear faster than the surface of the track segment 15. It is further contemplated that the contacting surfaces of the movers 20 may be removably mounted to the housing 50 of the mover 20 such that they may be replaced if the wear exceeds a predefined amount. According to still other embodiments, the movers 20 may include low-friction rollers to engage the surfaces of the track segment 15. Optionally, the surfaces of the channel 33 may include different cross-sectional forms with the mover 20 including complementary sectional forms. Various other combinations of shapes and construction of the track segment 15 and mover 20 may be utilized without deviating from the scope of the invention.

According to the illustrated system 5, each mover 20 is configured to slide along the channel 33 as it is propelled by a linear drive system. The mover 20 includes a body 55 configured to fit within the channel 33. The body 55 includes a lower surface 60, configured to engage the bottom surface 35 of the channel 33, and side surfaces 65 configured to engage the side walls 40 of the channel 33. The mover 20 further includes a shoulder 70 extending inward from each of the side surfaces 65. The shoulder 70 has a width equal to or greater than the width of the rail 45 protruding into the channel 33. A neck of the mover then extends upward to a top surface 75 of the body 55. The neck extends for the thickness of the rails such that the top surface 75 of the body 55 is generally parallel with the upper surface of each rail 45. The mover 20 further includes a platform 80 secured to the top surface 75 of the body 55. According to the illustrated embodiment, the platform 80 is generally square and the width of the platform 80 is greater than the width between the rails 45. The lower surface of the platform 80, an outer surface of the neck, and an upper surface of the shoulder 70 define a channel 85 in which the rail 45 runs. The channel 85 serves as a guide to direct the mover 20 along the track. It is contemplated that platforms or attachments of various shapes may be secured to the top surface 75 of the body 55. Further, various workpieces, clips, fixtures, and the like may be mounted on the top of each platform 80 for engagement with a product to be carried along the track by the mover 20. The platform 80 and any workpiece, clip, fixture, or other attachment present on the platform may define, at least in part, a load present on the mover 20.

Figure 2:
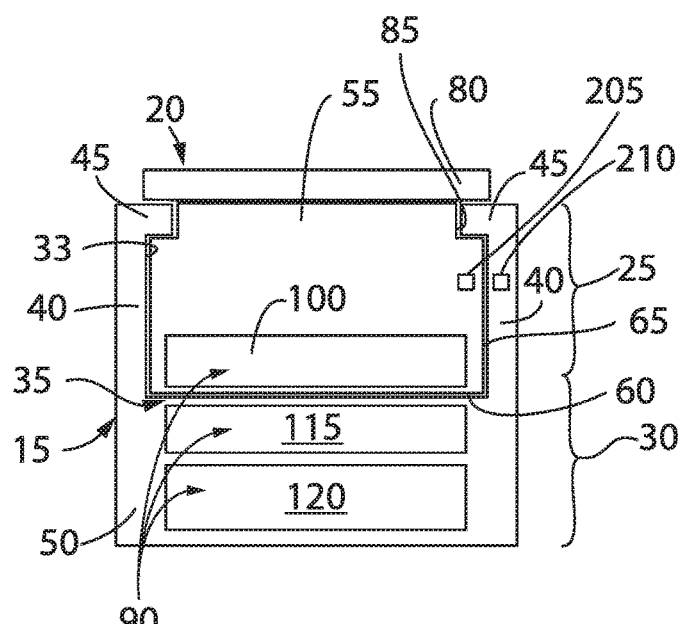
FIG. 2 is a sectional view of one embodiment of a mover and track segment included in the linear drive system taken at 2-2 of FIG. 1.
Figure 3:
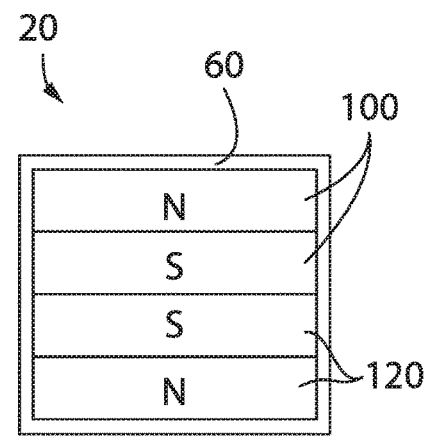
FIG. 3 is a bottom plan view of the exemplary mover of FIG. 2.
Figure 4:
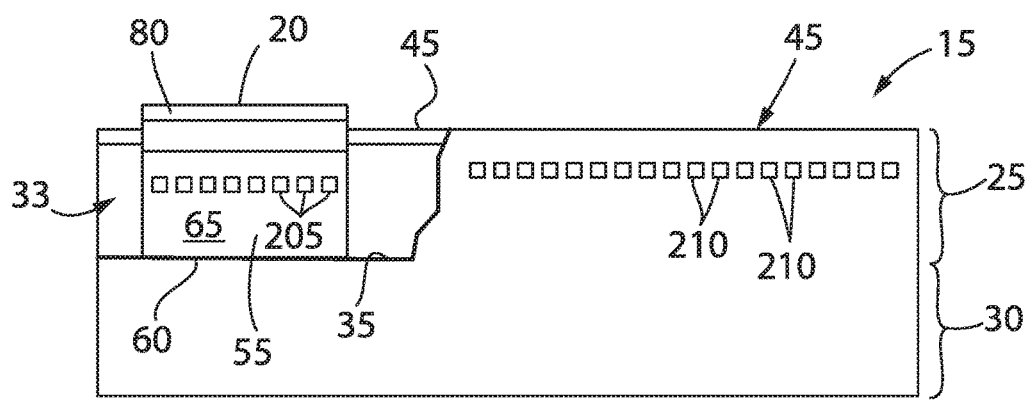
FIG. 4 is a partial side cutaway view of the mover and track segment of FIG. 2.

The mover 20 is carried along the track 10 by a linear drive system 90 (FIG. 2). The linear drive system 90 is incorporated in part on each mover 20 and in part within each track segment 15. One or more drive magnets 100 are mounted to each mover 20. With reference to FIG. 3, the drive magnets 100 are arranged in a block on the lower surface of each mover. The drive magnets 100 include positive magnet segments 105, having a north pole, N, facing outward from the mover and negative magnet segments 110, having a south pole, S, facing outward from the mover. According to the illustrated system 5, two positive magnet segments 105 are located on the outer sides of the set of magnets and two negative magnet segments 110 are located between the two positive magnet segments 105. Optionally, the positive and negative motor segments may be placed in an alternating configuration. In still other constructions, a single negative magnet segment 110 may be located between the positive magnet segments 105. Various other configurations of the drive magnets 100 may be utilized without deviating from the scope of the invention.

Figure 5:
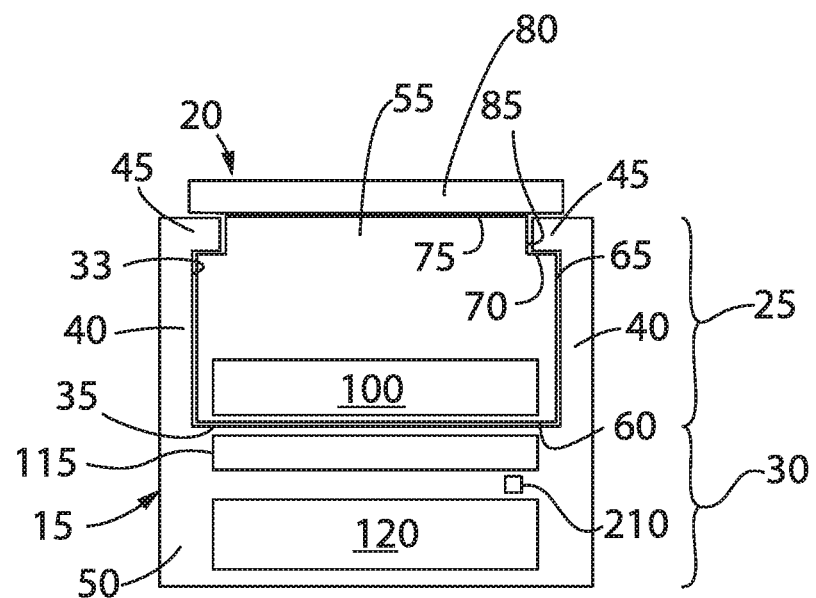
FIG. 5 is a sectional view of another embodiment of a mover and track segment included in the linear drive system taken at 2-2 of FIG. 1.
Figure 6:
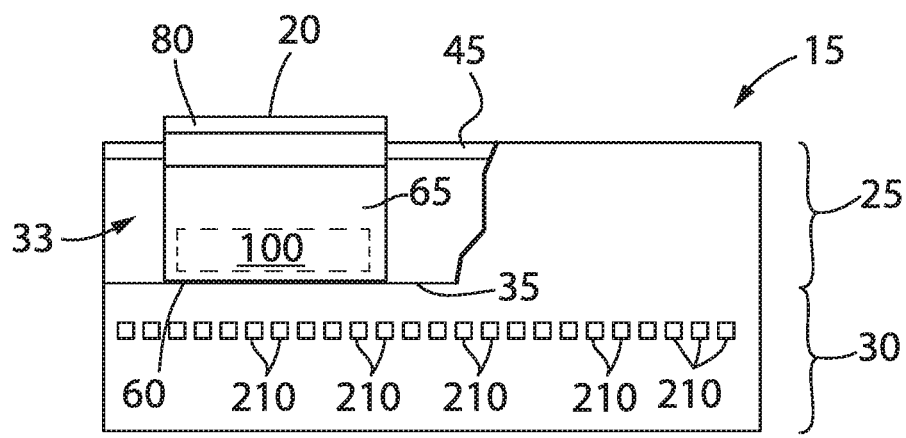
FIG. 6 is a partial side cutaway view of the mover and track segment of FIG. 5.

The linear drive system 90 further includes a series of coils 115 spaced along the length of the track segment 15. With reference also to FIGS. 5 and 6, the coils 115 may be positioned within the housing 50 for the track segment 15 and below the bottom surface 35 of the channel 33. The coils 115 are energized sequentially according to the configuration of the drive magnets 100 present on the movers 20. The sequential energization of the coils 115 generates a moving electromagnetic field that interacts with the magnetic field of the drive magnets 100 to propel each mover 20 along the track segment 15.

A segment controller 120 is provided within each track segment 15 to control the linear drive system and to achieve the desired motion of each mover 20 along the track segment 15. Although illustrated in FIG. 1 as blocks external to the track segments 15, the arrangement is to facilitate illustration of interconnects between controllers. As shown in FIG. 2, it is contemplated that each segment controller 120 may be mounted in the lower portion 30 of the track segment 15. Each segment controller 120 is in communication with a central controller 125 which is, in turn, in communication with an industrial controller 130. The industrial controller 130, also referred to herein as a process controller, may be, for example, a programmable logic controller (PLC) configured to control elements of a process line stationed along the track 10. The process line may be configured, for example, to fill and label boxes, bottles, or other containers loaded onto or held by the movers 20 as they travel along the line. In other implementations, robotic assembly stations may perform various assembly and/or machining tasks on workpieces carried along by the movers 20. The exemplary industrial controller 130 includes: a power supply 135 with a power cable 140 connected, for example, to a utility power supply; a communication module 145 connected by a network medium 150 to the central controller 125; a processor module 155; an input module 160 receiving input signals 165 from sensors or other devices along the process line; and an output module 170 transmitting control signals 175 to controlled devices, actuators, and the like along the process line. The processor module 155 may identify when a mover 20 is required at a particular location and may monitor sensors, such as proximity sensors, position switches, or the like to verify that the mover 20 is at a desired location. The processor module 155 transmits the desired locations of each mover 20 to a central controller 125 where the central controller 125 operates to generate commands for each segment controller 120.

Figure 7:
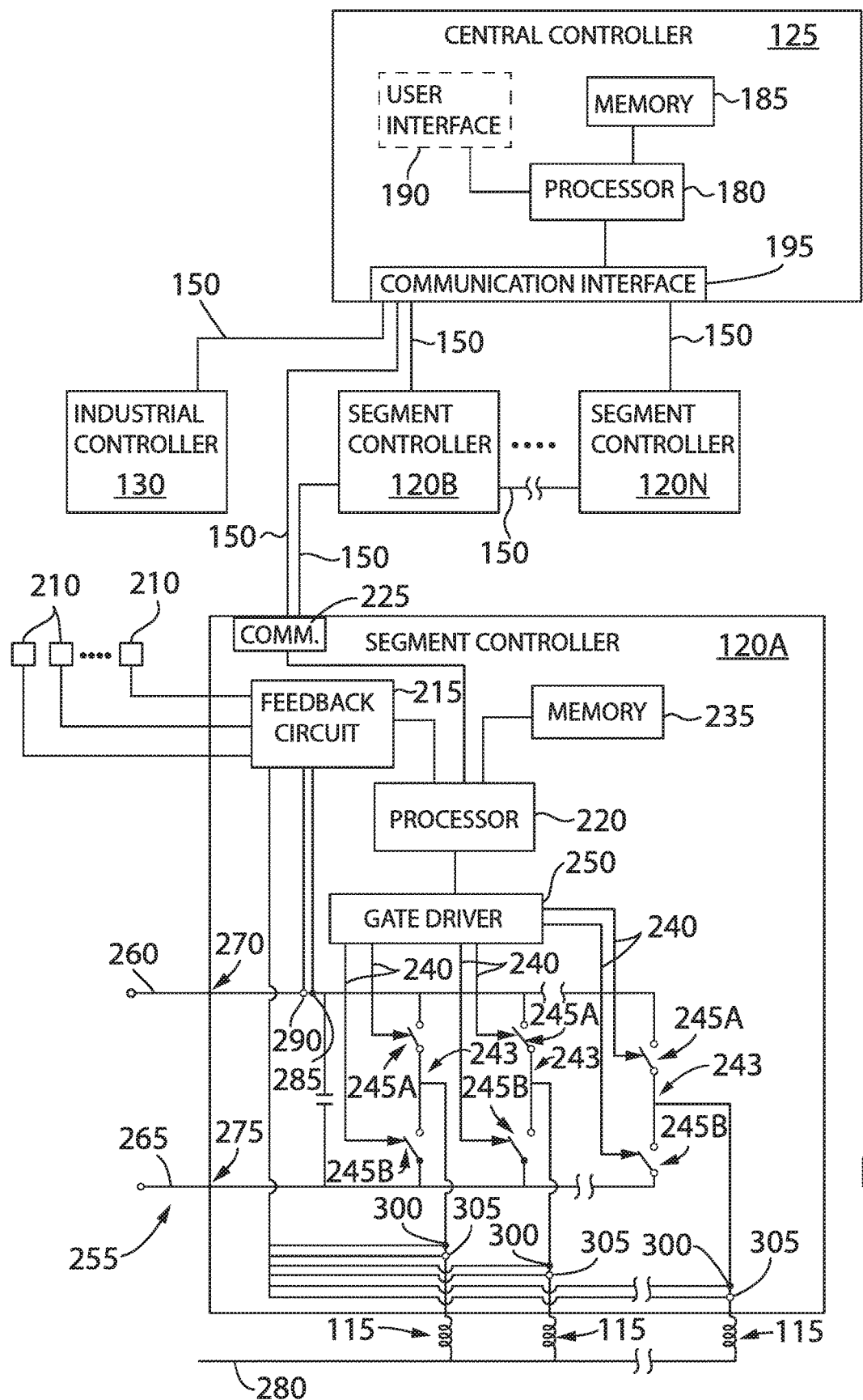
FIG. 7 is a block diagram representation of the exemplary control system of FIG. 1.

With reference also to FIG. 7, the central controller 125 includes a processor 180 and a memory 185. It is contemplated that the processor 180 and memory 185 may each be a single electronic device or formed from multiple devices. The processor 180 may be a microprocessor. Optionally, the processor 180 and/or the memory 185 may be integrated on a field programmable gate array (FPGA) or an application specific integrated circuit (ASIC). The memory 185 may include volatile memory, non-volatile memory, or a combination thereof. An optional user interface 190 may be provided for an operator to configure the central controller 125 and to load or configure desired motion profiles for the movers 20 on the central controller 125. Optionally, the configuration may be performed via a remote device connected via a network and a communication interface 195 to the central controller 125. It is contemplated that the central controller 125 and user interface 190 may be a single device, such as a laptop, notebook, tablet or other mobile computing device. Optionally, the user interface 190 may include one or more separate devices such as a keyboard, mouse, display, touchscreen, interface port, removable storage medium or medium reader and the like for receiving information from and displaying information to a user. Optionally, the central controller 125 and user interface may be an industrial computer mounted within a control cabinet and configured to withstand harsh operating environments. It is contemplated that still other combinations of computing devices and peripherals as would be understood in the art may be utilized or incorporated into the central controller 125 and user interface 190 without deviating from the scope of the invention.

The central controller 125 includes one or more programs stored in the memory 185 for execution by the processor 180. The central controller 125 receives a desired position from the industrial controller 130 and determines one or more motion profiles for the movers 20 to follow along the track 10. A program executing on the processor 180 is in communication with each segment controller 120 on each track segment via a network medium 150. The central controller 125 may transfer a desired motion profile to each segment controller 120. Optionally, the central controller 125 may be configured to transfer the information from the industrial controller 130 identifying one or more desired movers 20 to be positioned at or moved along the track segment 15, and the segment controller 120 may determine the appropriate motion profile for each mover 20.

A position feedback system provides knowledge of the location of each mover 20 along the length of the track segment 15 to the segment controller 120. According to the system 5 illustrated in FIGS. 2 and 4, the position feedback system includes one or more position magnets 205 mounted to the mover 20 and an array of sensors 210 spaced along the side wall 40 of the track segment 15. The sensors 210 are positioned such that each of the position magnets 205 is proximate to the sensor as the mover 20 passes each sensor 210. The sensors 210 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 210 outputs a feedback signal provided to the segment controller 120 for the corresponding track segment 15 on which the sensor 210 is mounted. The feedback signal may be an analog signal provided to a feedback circuit 215 which, in turn, provides a signal to the processor 220 corresponding to the magnet 205 passing the sensor 210.

According to another arrangement, illustrated in FIGS. 5 and 6, the position feedback system utilizes the drive magnets 100 as position magnets. Position sensors 210 are positioned along the track segment 15 at a location suitable to detect the magnetic field generated by the drive magnets 100. According to the illustrated embodiment, the position sensors 210 are located below the coils 115. Optionally, the position sensors 210 may be interspersed with the coils 115 and located, for example, in the center of a coil or between adjacent coils. According to still another embodiment, the position sensors 210 may be positioned within the upper portion 25 of the track segment 15 and near the bottom surface 35 of the channel 33 to be aligned with the drive magnets 100 as each mover 20 travels along the tracks segment 15.

Referring again to FIG. 7, the segment controller 120 also includes a communication interface 225 that receives communications from the central controller 125 and/or from adjacent segment controllers 120. The communication interface 225 extracts data from the message packets on the industrial network and passes the data to a processor 230 executing in the segment controller 120. The processor may be a microprocessor. Optionally, the processor 230 and/or a memory 235 within the segment controller 120 may be integrated on a field programmable gate array (FPGA) or an application specific integrated circuit (ASIC). It is contemplated that the processor 230 and memory 235 may each be a single electronic device or formed from multiple devices. The memory 235 may include volatile memory, non-volatile memory, or a combination thereof. The segment controller 120 receives the motion profile or desired motion of the movers 20 and utilizes the motion commands to control movers 20 along the track segment 15 controlled by that segment controller 120.

Each segment controller 120 generates switching signals to generate a desired current and/or voltage at each coil 115 in the track segment 15 to achieve the desired motion of the movers 20. The switching signals 240 control operation of switching devices 245 for the segment controller 120. According to the illustrated system 5, the segment controller 120 includes a dedicated gate driver module 250 which receives command signals from the processor 220, such as a desired voltage and/or current to be generated in each coil 115, and generates the switching signals 240. Optionally, the processor 220 may incorporate the functions of the gate driver module 250 and directly generate the switching signals 240. The switching devices 245 may be a solid-state device that is activated by the switching signal, including, but not limited to, transistors, thyristors, or silicon-controlled rectifiers.

According to the illustrated system 5, the track 10 receives power from a distributed DC voltage. A DC bus 255 receives a DC voltage, $V_{DC}$, from a DC supply and conducts the DC voltage to each track segment 15. The illustrated DC bus 255 includes two voltage rails 260, 265 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated in FIG. 1 as being external to the track segment 15, it is contemplated that the DC bus 255 would extend within the lower portion 30 of the track segment. Each track segment 15 includes connectors to which either the DC supply or another track segment may be connected such that the DC bus 255 may extend for the length of the track 10. Optionally, each track segment 15 may be configured to include a rectifier section (not shown) and receive an AC voltage input. The rectifier section in each track segment 15 may convert the AC voltage to a DC voltage utilized by the corresponding track segment.

The DC voltage from the DC bus 255 is provided at the input terminals 270, 275 to a power section for the segment controller. A first voltage potential is present at the first input terminal 270 and a second voltage potential is present at the second input terminal 275. The DC bus 255 extends into the power section defining a positive rail 260 and a negative rail 265 within the segment controller 120. The terms positive and negative are used for reference herein and are not meant to be limiting. It is contemplated that the polarity of the DC voltage present between the input terminals 260, 265 may be negative, such that the potential on the negative rail 265 is greater than the potential on the positive rail 260. Each of the voltage rails 260, 265 are configured to conduct a DC voltage having a desired potential, according to application requirements. According to one arrangement, the positive rail 260 may have a DC voltage at a positive potential and the negative rail 265 may have a DC voltage at ground potential. Optionally, the positive rail 260 may have a DC voltage at ground potential and the negative rail 265 may have a DC voltage at a negative potential. According to still another arrangement, the positive rail 260 may have a first DC voltage at a positive potential with respect to the ground potential and the negative rail 265 may have a second DC voltage at a negative potential with respect to the ground potential. The resulting DC voltage potential between the two rails 260, 265 is the difference between the potential present on the positive rail 260 and the negative rail 265.

It is further contemplated that the DC supply may include a third voltage rail having a third voltage potential. According to one implementation, the positive rail 260 has a positive voltage potential with respect to ground, the negative rail 265 has a negative voltage potential with respect to ground, and the third voltage rail is maintained at a ground potential. Optionally, the negative voltage rail 265 may be at a ground potential and the positive voltage rail 260 may be at a first positive voltage potential with respect to ground, and the third voltage rail may be at a second positive voltage potential with respect to ground, where the second positive voltage potential is approximately one half the magnitude of the first positive voltage potential. With such a split voltage DC bus, two of the switching devices 245 may be used in pairs to control operation of one coil 115 by alternately provide positive or negative voltages to one the coils 115.

The power section in each segment controller 120 may include multiple legs, where each leg is connected in parallel between the positive rail 260 and the negative rail 265. According to the illustrated system 5, three legs are shown. However, the number of legs may vary and will correspond to the number of coils 115 extending along the track segment 15. Each leg includes a first switching device 245a and a second switching device 245b connected in series between the positive rail 260 and the negative rail 265 with a common connection 243 between the first and second switching devices 245a, 245b. The first switching device 245a in each leg 221 may also be referred to herein as an upper switch, and the second switching device 245b in each leg 221 may also be referred to herein as a lower switch. The terms upper and lower are relational only with respect to the schematic representation and are not intended to denote any particular physical relationship between the first and second switching devices 245a, 245b. The switching devices 245 include, for example, power semiconductor devices such as transistors, thyristors, and silicon-controlled rectifiers, which receive the switching signals 240 to turn on and/or off. Each of switching devices may further include a diode connected in a reverse parallel manner between the common connection 243 and either the positive or negative rail 260, 265.

The processor 220 also receives feedback signals from sensors providing an indication of the operating conditions within the power segment or of the operating conditions of a coil 115 connected to the power segment. According to the illustrated system 5, the power segment includes a voltage sensor 285 and a current sensor 290 at the input of the power segment. The voltage sensor 285 generates a voltage feedback signal and the current sensor 290 generates a current feedback signal, where each feedback signal corresponds to the operating conditions on the positive rail 260. The segment controller 120 also receives feedback signals corresponding to the operation of coils 115 connected to the power segment. A voltage sensor 300 and a current sensor 305 are connected in series with the coils 115 at each output of the power section. The voltage sensor 300 generates a voltage feedback signal and the current sensor 305 generates a current feedback signal, where each feedback signal corresponds to the operating condition of the corresponding coil 115. The processor 230 executes a program stored on the memory device 235 to regulate the current and/or voltage supplied to each coil and the processor 230 and/or gate driver module 250 generates switching signals 240 which selectively enable/disable each of the switching devices 245 to achieve the desired current and/or voltage in each coil 115. The energized coils 115 create an electromagnetic field that interacts with the drive magnets 100 on each mover 20 to control motion of the movers 20 along the track segment 15.

Figure 8:
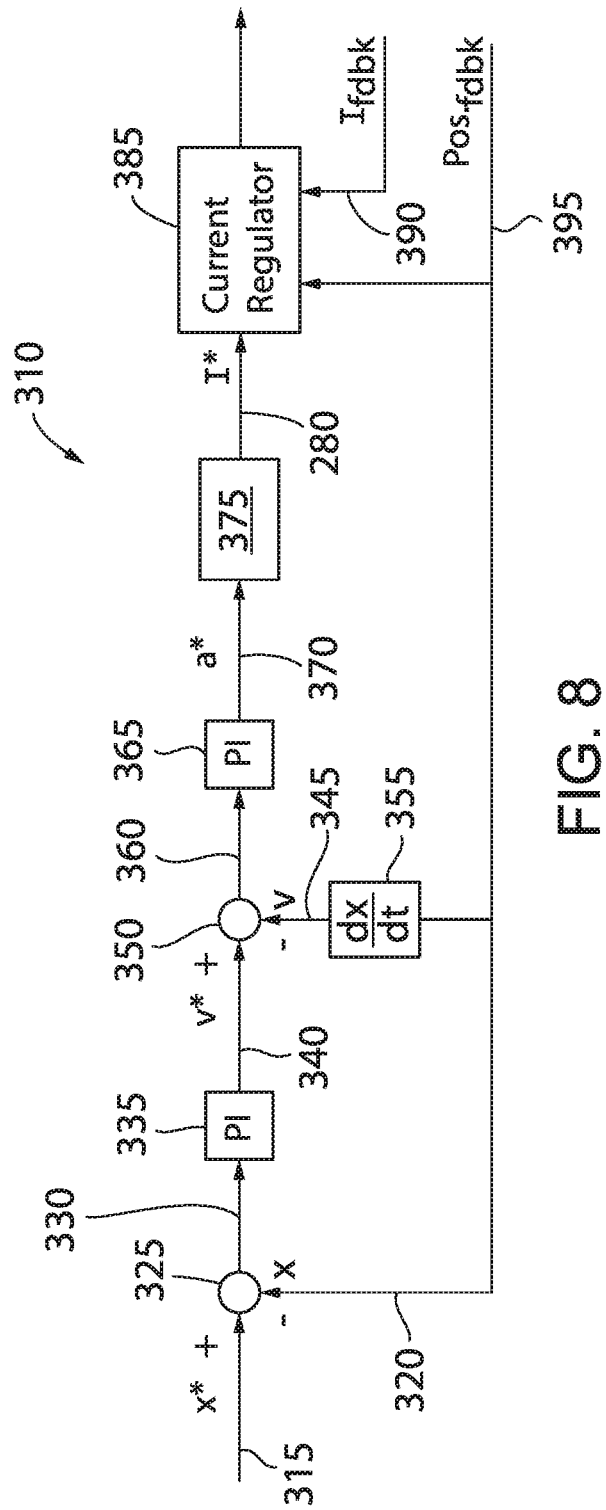
FIG. 8 is an exemplary control module included for execution on a segment controller according to one embodiment of the invention.

In one operation, each track segment 15 is configured to control operation of each mover 20 present on the track segment 15. The segment controller 120 receives a command signal corresponding to the desired operation of each mover 20 and controls the current output to each coil 115 to achieve the desired operation. With reference to FIG. 8, one implementation of a control module 310 executable by the segment controller 120 is illustrated. The control module 310 receives a position command signal (x*) 315 as an input. The position command signal (x*) is compared to a position feedback signal (x) 320 at a first summing junction 325. A position error signal 330 is output from the first summing junction 325 and input to a position loop controller 335. According to FIG. 8, the position loop controller 335 includes a proportional and an integral (PI) controller. Optionally, the position loop controller 335 may be just a proportional (P) controller or further include a derivative (D) controller. Each of the proportional (P), integral (I), and/or derivative (D) controllers of the position loop controller 335 includes a controller gain value. The controller gain values are commonly referred to as a proportional gain (Kpp), integral gain (Kpi), and a derivative gain (Kpd). The output of the position loop controller 335 is a velocity reference signal (v*) 340.

The velocity reference signal (v*) 340 is compared to a velocity feedback signal (v) 345 at a second summing junction 350. The velocity feedback signal (v) 345 is generated by a derivative block 355 acting on the position feedback signal 320. A velocity error 360 signal is output from the second summing junction 350 and input to a velocity loop controller 365. According to FIG. 8, the velocity loop controller 365 includes a proportional and an integral (PI) controller. Optionally, the velocity loop controller 365 may be just a proportional (P) controller or further include a derivative (D) controller. Each of the proportional (P), integral (I), and/or derivative (D) controllers of the velocity loop controller 365 includes a controller gain value. The controller gain values are commonly referred to as a proportional gain (Kvp), integral gain (Kvi), and a derivative gain (Kvd). The output of the velocity loop controller 365 is an acceleration reference signal (a*) 370.

The acceleration reference signal 370 is passed through an additional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 120.

The current reference, I*, 380 is, in turn, passed to a current regulator 385, which controls the current supplied to each coil 115 on the track segment. The current regulator 385 receives current feedback signals from the current sensors 305 and position feedback information identifying the measured position of each mover 20. Because a mover 20 may span multiple coils 115, the current regulator 385 determines an appropriate current for each coil 115 to produce the force desired to control the mover as indicated by the current reference, I*, 380 and determines a resultant current desired for each coil 115. The current regulator 385 uses the current and position feedback 390 and 395 information to regulate the current to each coil 115, accordingly.

The output of the current regulator 385 is provided as an input to the gate driver module 250. With reference again to FIG. 7, the gate driver module 250 converts the input to a desired output voltage having a variable amplitude and frequency. Having determined the desired output voltage required to produce the commanded input, the gate driver module 250 generates the gating signals 240 used by pulse width modulation (PWM) or by other modulation techniques to control the switching elements 245a, 245b to produce the desired currents in each coil 115, resulting in the desired motion for each mover 20.

Figure 9:
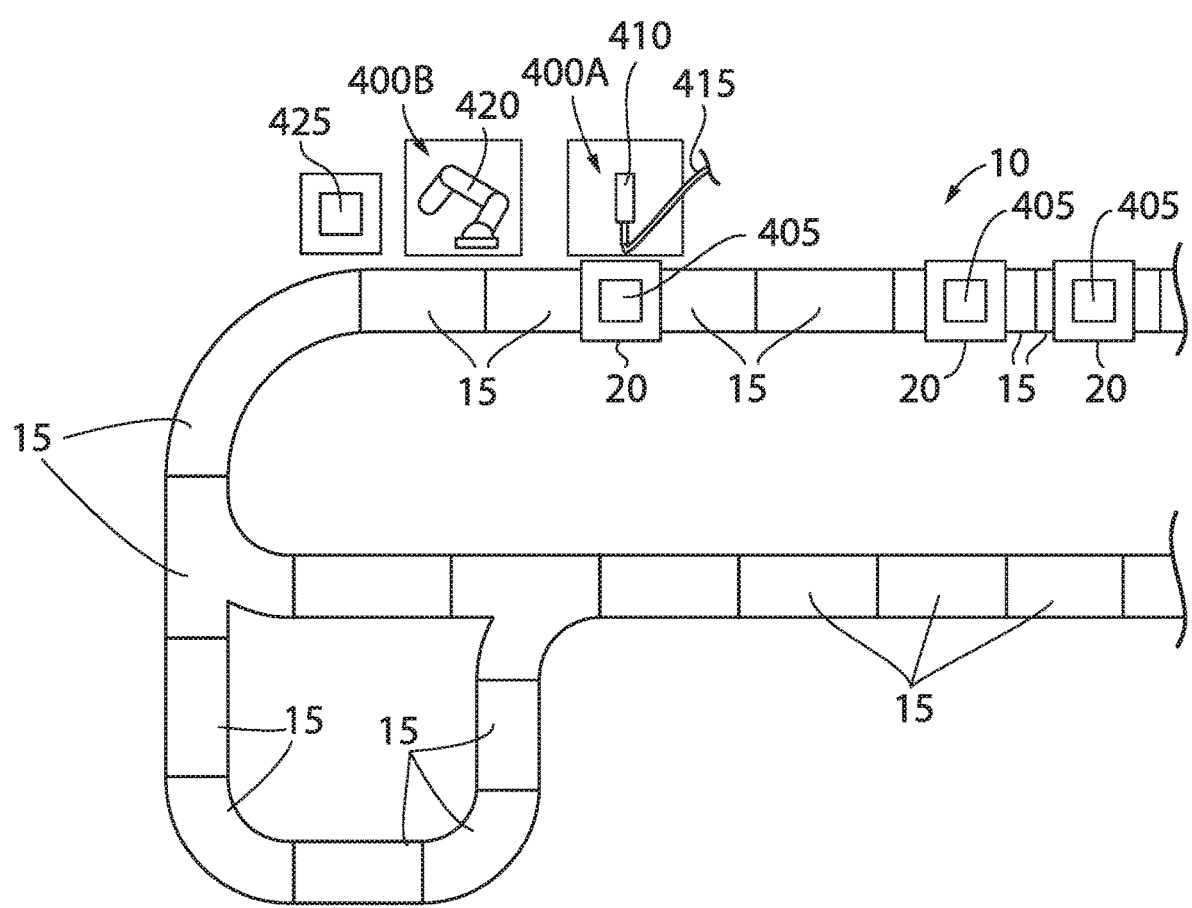
FIG. 9 is a top plan view of a portion of an exemplary track illustrating movers on the track and stations located along the track.

With reference to FIG. 9, a portion of an exemplary track 10 is illustrated. Movers 20 are traveling along the track 10, and two stations 400A, 400B are shown at different positions along the track 10. A first station may, for example, be configured to fill a container 405 located on the mover 20. A cylinder 410 located on the first station 400A may extend over the container 405 with a hose 415 connected to the end of the cylinder 410. When the cylinder 410 is extended, the hose 415 may include a fitting configured to engage a complementary fitting on the container 405. Optionally, the end of the hose 415 may be positioned over an opening in the container 405 from which a product may be dispensed into the container 405. At a second station 400B, a robotic arm 420 may be configured to pick up a cover 425 for the container 405 from a stack of covers 425 positioned adjacent to the arm and to place the cover 425 on the container 405. Still other stations (not shown) may be configured, for example, to secure the cover 425 to the container, affix a label to the container, or offload the container 405 from the mover 20. It is contemplated that the method for increasing throughput discussed below may be used for various stations performing various tasks, according to the application requirements without deviating from the scope of the invention.

During certain moves, a mover 20 may be commanded to a station 400 located along the track. The mover 20 located at the first station 400A, for example, may have had its container 405 filled with product and, subsequently, be commanded to move to the second station 400B to have a cover 425 placed on the container 405. Although shown adjacent to each other in FIG. 9, it is possible that the two stations may be located some distance from each other or, for example, on opposite sides of the one hundred eighty degree bend along the track. Traditionally, high throughput in the system would be achieved by commanding the mover 20 to accelerate as quickly as possible up to a maximum speed to traverse the distance between the first station 400A and the second station 400B. When the mover 20 would get close to the second station 400B, the mover 20 would be commanded to decelerate as quickly as possible and arrive at the second station 400B at the end of the deceleration. In certain applications, it may be undesirable to accelerate and/or decelerate the mover 20 at a maximum rate or, similarly, it may be undesirable to have the mover 20 travel along the track 10 at a maximum velocity. In other applications, even traveling at the maximum velocity or accelerating and decelerating at the maximum rates may not achieve a desired throughput in the system. Therefore, it would be desirable to provide an improved method and system for increasing throughput in the independent cart system.

Figure 10:
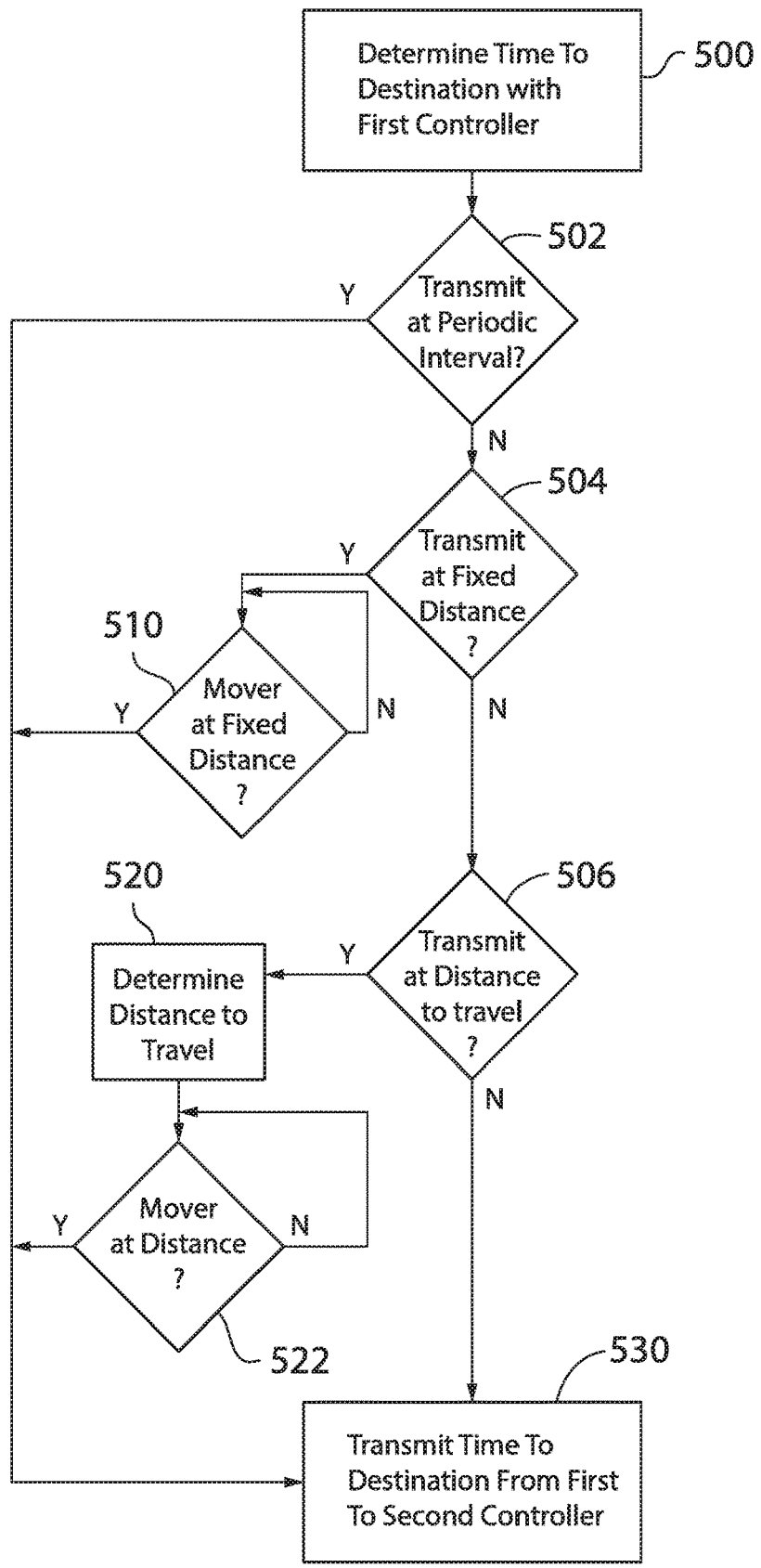
FIG. 10 is a flow diagram illustrating steps in one embodiment of the present invention to increase throughput in an independent cart system.

The segment controller 120 for each segment 15 controls operation of a mover 20 located on the segment 15. Based on the motion profile commanded for each mover 20, the segment controller 120 may determine a time it will take the mover 20 to reach a commanded destination, such as a station 400 located along the segment 15. The motion profile includes information related to the desired motion of the mover 20 such as the commanded velocity, a desired and/or maximum acceleration and/or deceleration rate for the mover 20 should the velocity need to change during travel along the track 10 or for slowing down as the mover 20 arrives at the station 400. With reference to FIG. 10, determination of a time to destination with the segment controller is an initial step, 500, in the process of improving throughput in the system.

Because each segment controller 120 is responsible for operation of a mover 20 present on the corresponding track segment 15, the segment controller may further be configured to determine a time to destination only when a mover 20 located on the track segment is commanded to move to a station 400. If a mover 20 is stopped on a track segment 15, awaiting a command to travel to a station 400, no time to destination needs to be determined, saving computation overhead on the segment controller 120 and reducing communication bandwidth on the network 150. If, however, the mover 20 is commanded to move to a station, it is contemplated that the time to destination may be determined as a function of the velocity at which the mover 20 is traveling, of the deceleration rate for the mover to slow to a stop when reaching the station, and of the distance between the current position of the mover and the position of the station.

As previously discussed, it is contemplated that a process controller 130 is configured to control operation of the devices at each station 400. According to the application illustrated in FIG. 9, the process controller 130 may be configured to control extending and retracting the cylinder 410 at the first station. The process controller 130 may further control filling of the container 405, for example, by opening a valve located at the end of the hose 415 or enabling a pump used to deliver product through the hose 415 into the container 405. The process controller 130 may similarly control operation of the robotic arm 420, causing the robotic arm 420 to pick up a cover 425 from the stack adjacent to the arm, rotate toward the container 405 on the mover and place the cover 425 on the container 405.

Each of the tasks performed, either at the first station 400A or at the second station 400B, may require execution of one or more initial preparation tasks before the station 400 interacts with the container 405 on a mover 20. The cylinder 410, for example, may be hydraulically or pneumatically actuated. A separate hydraulic or pneumatic system may need to be energized such that an accumulator is charged to a sufficient pressure to actuate the cylinder. While pressurization may take only a short time or may only need to be performed periodically (e.g., every 10th extension), if the process controller 130 waits for the mover 20 to arrive at the station 400 before pressurizing the accumulator, the mover 20 is delayed at the station for this duration of time. Similarly, the robotic arm 420 requires some time to grab a cover 425 and/or to position the cover 425 over the container 405. If the mover 20 must wait for the robotic arm 420 to perform these initial preparation tasks, the mover 20 is again delayed at the second station 400B during execution of these initial preparation tasks.

In order to improve throughput in the system, the segment controller 120 may be configured to transmit the time to destination, which was determined at step 500, to the process controller 130. The process controller 130 may, in turn, use the time to destination to initiate execution of one or more of the preparation tasks for a device at the station 400 to which the mover 20 is commanded to arrive prior to the mover 20 arriving at the station 400. As shown in steps 502, 504, and 506, it is contemplated that various different methods may be used to transmit the time to destination from the segment controller 120 to the process controller 130.

At step 502, the segment controller 120 may be configured to transmit the time to destination from the segment controller to the process controller 130 at a periodic interval of time. The segment controller 120 may determine the time to destination at a first time interval, for example, in the tens of microseconds during execution of a routine to control operation of the mover. Transmission of the time to destination at the same periodic interval may, however, create an undesirable burden on the network 150 connecting the segment controller 120 to the process controller 130. The segment controller 120 may instead transmit the time to destination in millisecond, or tens of millisecond, time intervals. If configured to transmit at a periodic interval, as determined in step 502, the segment controller may jump to step 530 and transmit the time to destination from the segment controller to the process controller at the desired interval. The process controller 130 may store a table containing a time required for execution of preparation tasks at different stations 400 and for different equipment at the station. When the process controller 130 receives a time to destination that is less than required time to execute a preparation task, the process controller 130 may begin execution of the preparation task in anticipation of the mover 20 arriving at the station. In this manner, at least a portion of the preparation task may be performed prior to the mover 20 arriving at the station and, thereby, reducing the amount of time the mover 20 is required to wait at one station before moving to the next station. It is further contemplated that the periodic time interval may be configured as a function of the velocity at which the mover 20 is traveling along the track. At higher velocities, the periodic interval may be reduced, and, at lower velocities, the periodic interval may be increased.

If, however, the segment controller 120 is not configured to transmit at a periodic interval, as determined in step 502, the segment controller may continue to step 504 and determine whether to transmit the time to destination at a fixed distance from the destination. When the segment controller 120 is configured to transmit the time to destination at a fixed distance, the segment controller proceeds to step 510. At step 510, the segment controller monitors the present position of the mover and compares this position to the fixed distance from the station. When the mover 20 is at the fixed distance from the station, the segment controller proceeds to step 530 and transmits the time to destination to the process controller 130. Because the time to destination varies as a function of the velocity of the mover 20, and because the time to execute various initial preparation tasks varies as well, it is possible that the time to destination may be either less than or greater than the time required to execute one of the initial preparation tasks. However, transmitting the time to distance at a predefined location and only once reduces computational burden on the segment controller 120 and minimizes the network bandwidth required to transmit the data. When the time to destination exceeds the time required to execute one of the initial preparation tasks, the process controller 130 may start an initial delay timer which is set equal to the difference in the time to destination and the time required to execute the initial task. When the initial delay timer is complete, the process controller 130 may then execute the initial task, allowing the equipment to be ready to interact with the mover 20 when it arrives at the station. If the time to destination is less than the time required for the initial preparation task, the process controller 130 may immediately start execution of the initial preparation task. Although the mover 20 will need to wait at the station 400 for a portion of the time period required for the initial preparation task, the overall duration that the mover 20 remains at the station is still reduced.

If the segment controller 120 is neither configured to transmit at a periodic interval, as determined in step 502, nor configured to transmit the time to destination at a fixed distance from the destination, as determined in step 504, the segment controller 120, as shown in step 506, may be configured to determine an actual distance of travel required by the mover 20, for example, to decelerate from the velocity at which the mover 20 is traveling to a stop and use that distance to determine when to transmit the distance to the process controller. At step 520, the segment controller 120 determines the distance to travel as a function of the current velocity and the deceleration rate in the commanded motion profile for the mover 20. At step 522, the segment controller monitors the present position of the mover and compares this position to the corresponding distance to travel during deceleration. When the mover 20 is at the distance to travel during deceleration, the segment controller proceeds to step 530 and transmits the time to destination to the process controller 130. In contrast to transmitting at a fixed distance, as previously discussed, determining a distance to travel that is a function of the velocity and deceleration, allows for the segment controller 120 to transmit the time to destination when the mover 20 is a greater distance from the station 400 for higher velocities and to transmit the time to destination when the mover 20 is a shorter distance from the station 400 for lower velocities. This provides the process controller 130 a consistent amount of time to execute initial preparation tasks regardless of the velocity of the mover 20.

According to still another embodiment, the segment controller 120 may be configured to determine the time to destination at a longer periodic interval or, alternately, the bandwidth on the network 150 may be sufficient to transmit the time to destination between the segment controller 120 and the process controller 130 at whatever rate it is determined. In this instance the segment controller 120 may be configured to transition directly between step 500 and step 530 and transmit the time to destination from the segment controller to the process controller as it is determined.

Although FIG. 10 illustrates the steps in transmitting the time to destination from the segment controller 120 to the process controller 130 as including multiple options for transmitting the time to destination, it is contemplated that only a single decision block may be utilized, where a single method of transmitting the time to destination from the segment controller 120 to the process controller 130 is implemented. Optionally, the segment controller 120 may include a configuration parameter which selects one of the methods for transmitting the time to destination and the segment controller 120 may execute only those steps associated with the selected method.

In addition to determining a time to destination, the segment controller 120 may also determine a settling time corresponding to a time for the mover 20 to reach a state in which the external device may interact with the mover 20 or with a load present on the mover. It is contemplated that the state for the mover 20 in which the external device may interact with the mover may be either when the mover 20 is stopped or while the mover 20 is still being transferred along the track 10. In one aspect of the invention, the state for the mover in which the external device interacts with the mover, or a load on the mover, is stopped at a station 400. As the mover approaches the station 400, the mover 20 may be decelerating to a stop. If the mover is initially traveling at a slow speed and the deceleration rate is low, the mover 20 may be fully at rest and ready for interaction with an external device at the same instant the mover 20 reaches the station 400. As the velocity at which the mover 20 is traveling increases and/or the rate of deceleration for the mover increases, the mover 20 may be more likely to exhibit some overshoot and/or oscillation around the station position as the mover 20 arrives at a station 400. While the segment controller 120 may determine the mover 20 is at the station when the position feedback signal initially corresponds to the station position, if there is some overshoot or oscillation, the mover 20 may transition in-and-out of, or back-and-forth past the station position once or multiple times before finally being fully stopped at the station position. According to this embodiment of the invention, the settling time is a measured amount of time required by the mover 20 to completely stop at the station position. In this example, the settling time may also be referred to as a stopping time. The stopping time may be measured from a predefined location along the track or from the time the mover 20 is commanded to decelerate into the station. The predefined location may be, for example, the station position and the amount of time it takes the mover 20 to become fully stopped at the station position after initially reaching the station position is the settling time for the mover 20. The settling time may vary as a function of a number of factors including, but not limited to the velocity of the mover, the deceleration rate of the mover, the load present on the mover, the physical construction of the mover, or the values of gains used in the controller. Because a device that is external to the mover 20 may require precise positioning of the mover to engage an object on the mover 20, it is desirable to wait until the mover 20 has fully stopped at the station prior engaging the mover 20.

In certain applications, it may be possible that the device external to the mover 20 may begin interacting with the mover 20 before it has completely stopped at the station position 400. The segment controller 120 may include a first setting corresponding to a speed threshold, below which the mover 20 is considered to be stopped and/or a second setting corresponding to a position window, where the mover 20 is considered to be at the station 400 when the distance between the mover 20 and the position of the station is less than the position window. The stopping time may be determined in a similar manner to that described above; however, rather than determining the stopping based on the mover 20 coming to a complete stop at the station, the segment controller 120 determines a stopping time based on the mover slowing to a speed less than the first setting and/or the mover 20 being within the position window corresponding to the station 400.

According to another aspect of the invention, the state for the mover 20 in which the external device interacts with the mover is when the mover 20 is traveling at a constant velocity past the station 400. In certain applications, the external device may, for example, apply a label from a roller or a bead of adhesive to a product on the mover 20 as the mover travels past the station. It is contemplated that the mover 20 may continue traveling at a maximum velocity or may decelerate to a lower velocity before reaching the station 400. According to this embodiment of the invention, the settling time corresponds to a time required for the mover 20 to achieve the desired velocity. The segment controller 120 may begin measuring the settling time when the mover 20 passes a predefined location along the track, when the mover 20 is initially commanded to change velocity, or when the mover 20 initially reaches the new velocity. Similar to coming to a complete stop at a station 400, changing velocity may include some overshoot and/or oscillation. The amount of overshoot or oscillation may depend on a number of factors including, but not limited to, the initial velocity, the new velocity, the deceleration or acceleration rate, and the controller gains. It is also contemplated that the segment controller 120 may include settings defining a velocity band and/or a position band. The mover 20 may be determined to be at the state at which the external device may interact with the mover, or a load present on the mover, when the mover reaches the new velocity or is within a velocity band at the station 400 or within the position band on either side of the station 400. When the segment controller 120 determines the mover 20 has reached the state at which the external device may interact with the mover, it may stop measuring the settling time and set the settling time equal to the measured duration.

As previously discussed, the segment controller 120 is transmitting a time to destination to the process controller 130 in order for the process controller 130 to have an opportunity to execute initial preparation tasks for devices external to the mover that are intended to engage the mover 20 and or a load present on the mover in order to increase throughput of the movers through the system 5. The movers 20 are typically configured to travel at a high rate of speed and to decelerate at a maximum safe deceleration rate in order to also increase the throughput of the system. Operating the movers at high velocities and deceleration rates, however, is likely to cause an increased settling time for the mover 20 at a station, increasing the waiting time for an external device to interact with the mover 20 after the mover initially arrives at the station 400.

In order to further improve the throughput of the system, the segment controller 120 may be further configured to measure the settling time for each mover 20 as the mover arrives at a station 400, as discussed above. The settling time may vary for each mover 20 and for varying loads present on a mover. Further, a single mover 20 may experience some variation in the settling time at different instances of approaching the same station 400. The segment controller 120 may, therefore, maintain a running average for settling time of a mover. It is further contemplated, that multiple running averages may be maintained for a single mover, where the running average varies based, for example, on the initial velocity at which the mover is traveling, the deceleration rate of the mover, or of a load present on the mover. The segment controller 120 may maintain a table of running averages in the memory 235 of the segment controller for each mover 20 approaching each station 400 in the system 5 and may further store various running averages for each mover approaching difference stations under different operating conditions.

Having determined a settling time of a mover 20 approaching a station 400, the segment controller 120 may additionally transmit the settling, or stopping, time to the process controller 130 in addition to the time to destination as previously discussed. It is contemplated that the settling time and the time to destination may be transmitted as separate values or combined to a single value.

According to another aspect of the invention, the segment controller 120 may determine a standard deviation for each new settling time from the running average stored in memory 235. The memory 235 may be further configured to store a predefined level of the standard deviation which corresponds to a confidence level that the first mover will be ready at the station before the stopping time is complete. For example, an application may require only that the mover 20 be fully stopped at the station 400 eighty percent (80%) of the time. A settling time of five milliseconds may correspond to this confidence level. If, however, it is necessary to have the mover 20 fully stopped at the station 400 one hundred percent (100%) of the time, a settling time of ten milliseconds may correspond to this confidence level.

However, transmitting the longer settling time may reintroduce additional delay in operation of the external device. In order for the station 400 to be ready one hundred percent of the time when the mover 20 arrives, the process controller 130 would be required to begin execution of the initial preparation task at the greatest settling time. Based on the example above, this settling time is twice as great as the time required for eighty percent of operation. Thus, for eighty percent of the operation, the external device may be commanded to perform initial execution steps before they are necessary and the external device would be waiting in position for the mover 20 to arrive at the station prior to interacting with the mover 20. During this time, the eternal device may be inhibited from performing other tasks that may be required while a mover 20 is travelling between stations 400. Thus, it would be desirable to allow a short delay for the twenty percent of operations at which the external device may not be quite ready to interact with the mover 20 while reducing by one-half the amount of time for which the external device is waiting at a station 400 for the mover to arrive. The segment controller 120 may be configured to transmit to the process controller 130 the settling time that corresponds to the predefined deviation that achieves a desired confidence level rather than each newly determined settling time and/or the running average of the setline time.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An apparatus for increasing throughput in an independent cart system, the apparatus comprising:
   a plurality of movers;
   a track along which the plurality of movers travel, the track including:
   a plurality of track segments, wherein each of the plurality of track segments includes a segment controller operative to control operation of each of the plurality of movers present on the corresponding track segment; and
   a station position located along a length of one of the plurality of track segments configured to have the plurality of movers stop for interaction with a device external to the track; and
   a process controller in communication with the segment controller on each of the plurality of track segments, wherein:

a first segment controller located on one of the plurality of track segments is operative to determine a time to destination for a first mover, selected from the plurality of movers;
the time to destination corresponds to a time for the first mover to arrive at the station position from a current position of the first mover;
the first segment controller is further operative to transmit the time to destination to the process controller before the first mover arrives at the station position; and
the process controller is operative to initiate execution of at least one preparation task for the device at the station position responsive to receiving the time to destination from the first segment controller and before the first mover arrives at the station position.

2. The apparatus of claim 1 wherein:
the first segment controller is operative to determine a deceleration time for the first mover as a function of a speed of travel and of a deceleration rate for the first mover;
the first segment controller is operative to determine a deceleration distance, the deceleration distance corresponding to an expected distance to be traveled by the first mover during the deceleration time;
the first segment controller includes an input operative to receive a feedback signal indicating a position of the first mover along the corresponding track segment for the first segment controller;
the first segment controller is operative to determine a remaining distance to the station position, wherein the remaining distance corresponds to a difference between the position of the first mover as indicated by the feedback signal and the station position; and
the first segment controller is operative to transmit a signal to the process controller when the remaining distance corresponds to the deceleration distance.

3. The apparatus of claim 1 wherein:
the first segment controller includes an input operative to receive a feedback signal indicating a position of the first mover along the corresponding track segment for the first segment controller;
the first segment controller is operative to transmit the time to destination to the process controller at a predefined position along the track segment.

4. The apparatus of claim 1 wherein the first segment controller is configured to transmit the time to destination to the process controller at a periodic interval.

5. The apparatus of claim 1 wherein the first segment controller is further operative to measure a settling time of the first mover, wherein the settling time corresponds to a time required for the first mover to arrive at the station position and be ready for interaction with the device after either reaching a predefined location along the track or receiving a command to decelerate into the station.

6. The apparatus of claim 5 wherein the first segment controller is further operative to determine the time to destination for the first mover as a function of the settling time for the first mover.

7. The apparatus of claim 5 wherein the first segment controller is further operative to:
store the settling time in a memory in communication with the first segment controller;
determine a running average of the settling time as a function of the stored settling time; and
transmit the running average of the settling time to the process controller.

8. The apparatus of claim 7 wherein:
the first segment controller is further operative to determine a standard deviation of the settling time from the running average;
the memory is configured to store a predefined level of the standard deviation corresponding to a confidence level that the first mover will be ready at the station before the settling time is complete; and
the first segment controller transmits the settling time at the standard deviation of the running average corresponding to the confidence level to the process controller.

9. A method for increasing throughput in an independent cart system, the method comprising the steps of:
determining a time to destination of a first mover located along a length of a track in the independent cart system, wherein:
the first mover is selected from a plurality of movers present in the independent cart system,
the trick includes a plurality of track segments,
the time to destination corresponds to a time for the first mover to arrive at a station position from a current position of the first mover,
each track segment includes a segment controller operative to control operation of each of the plurality of movers present on the corresponding track segment, and
the segment controller determines the time to destination; and
transmitting the time to destination from the segment controller to a process controller in communication with the segment controller, wherein the process controller is operative to initiate execution of at least one preparation task for a device configured to interact with the first mover at the station position and wherein the time to destination is transmitted prior to the first mover arriving at the station position.

10. The method of claim 9 further comprising the steps of:
receiving a feedback signal at an input of the first segment controller wherein the feedback signal corresponds to the current position of the first mover along the corresponding track segment for the first segment controller;
determining a remaining distance to the station position with the first segment controller, wherein the remaining distance corresponds to a difference between the current position of the first mover and the station position;
determining a deceleration distance for the first mover as a function of a speed of travel and of a deceleration rate for the first mover; and
transmitting a signal to the process controller from the segment controller when the remaining distance corresponds to the deceleration distance.

11. The method of claim 9 further comprising the step of:
receiving a feedback signal at an input of the first segment controller wherein the feedback signal corresponds to a position of the first mover along the corresponding track segment for the first segment controller, wherein the first segment controller is operative to transmit the time to destination to the process controller at a predefined position along the track segment.

12. The method of claim 9 wherein the first segment controller is configured to transmit the time to destination to the process controller at a periodic interval.

13. The method of claim 9 further comprising the step of measuring a settling time of the first mover, wherein the settling time corresponds to a time required for the first mover to arrive at the station position and be ready for interaction with the device after either reaching a predefined location along the track or receiving a command to decelerate into the station.

14. The method of claim 13 further comprising the step of determining the time to destination for the first mover as a function of the settling time for the first mover.

15. The method of claim 13 further comprising the steps of:
- storing the settling time in a memory in communication with the first segment controller;
- determining a running average of the settling time with the first segment controller as a function of the stored settling time; and
- transmitting the running average of the settling time from the first segment controller to the process controller.

16. The method of claim 15 further comprising the steps of:
- determining a standard deviation of the running average with the first segment controller;
- reading a predefined level of the standard deviation stored in a memory of the first segment controller, the predefined level corresponding to a confidence level that the first mover will be ready at the station before the settling time is complete; and
- transmitting the settling time at the standard deviation corresponding to the confidence level from the first segment controller to the process controller.

17. A method for increasing throughput in an independent cart system, the method comprising the steps of:
- determining a time to destination of a first mover located along a length of a track in the independent cart system, wherein:
  - the first mover is selected from a plurality of movers present in the independent cart system,
  - the track includes a plurality of track segments,
  - the time to destination corresponds to a time for the first mover to arrive at a station position from a current position of the first mover,
  - each track segment includes a first controller operative to control operation of each of the plurality of movers present on the corresponding track segment, and
  - the first controller determines the time to destination; and
- transmitting the time to destination from the first controller to a second controller in communication with the first controller, wherein the second controller is operative to initiate execution of at least one preparation task for a device configured to interact with the first mover at the station position and wherein the time to destination is transmitted prior to the first mover arriving at the station position.

18. The method of claim 17 wherein the first controller is a central controller.

19. The method of claim 17 wherein the first controller includes a plurality of segment controllers and wherein each segment controller corresponds to one of the plurality of track segments.

20. The method of claim 17 wherein the second controller is a process controller.

* * * * *